(12) United States Patent
Kim

(10) Patent No.: US 9,819,716 B2
(45) Date of Patent: Nov. 14, 2017

(54) METHOD AND SYSTEM FOR VIDEO CALL USING TWO-WAY COMMUNICATION OF VISUAL OR AUDITORY EFFECT

(71) Applicant: LINE Corporation, Shibuya-ku, Tokyo (JP)

(72) Inventor: Keum Ryong Kim, Seongnam-si (KR)

(73) Assignee: LINE CORPORATION, Tokyo (JP)

( * ) Notice: Subject to any disclaimer, the term of this patent is extended or adjusted under 35 U.S.C. 154(b) by 0 days.

(21) Appl. No.: 15/378,860

(22) Filed: Dec. 14, 2016

(65) Prior Publication Data

US 2017/0171280 A1    Jun. 15, 2017

(30) Foreign Application Priority Data

Dec. 15, 2015    (KR) ........................ 10-2015-0179248

(51) Int. Cl.
| | | |
|---|---|---|
| *H04N 7/14* | (2006.01) | |
| *H04L 29/06* | (2006.01) | |
| *H04N 7/15* | (2006.01) | |
| *G06F 17/30* | (2006.01) | |

(52) U.S. Cl.
CPC ...... *H04L 65/605* (2013.01); *G06F 17/30781* (2013.01); *H04L 65/80* (2013.01); *H04N 7/147* (2013.01); *H04N 7/15* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,661,266 | B2 * | 5/2017 | Inoue | ...................... H04N 7/147 |
| 2011/0060835 | A1 * | 3/2011 | Dorso | ................. H04L 65/1069 709/227 |
| 2013/0242030 | A1 * | 9/2013 | Kato | ...................... H04L 65/403 348/14.07 |
| 2013/0260893 | A1 | 10/2013 | Shin et al. | |
| 2013/0332543 | A1 | 12/2013 | Shin et al. | |
| 2014/0019540 | A1 | 1/2014 | Shin et al. | |
| 2015/0222670 | A1 * | 8/2015 | Inoue | .................. H04L 65/1069 370/261 |

FOREIGN PATENT DOCUMENTS

| | | |
|---|---|---|
| KR | 20000074710 A | 12/2000 |
| KR | 20080016145 A | 2/2008 |
| KR | 20090054609 A | 6/2009 |
| KR | 20100050021 A | 5/2010 |
| KR | 20100062207 A | 6/2010 |
| KR | 20110068260 A | 6/2011 |
| KR | 20110125823 A | 11/2011 |
| WO | WO-2015065001 A1 | 5/2015 |

OTHER PUBLICATIONS

Office Action from corresponding Korean Patent Application 10-2017-0078078, dated Sep. 11, 2017.

* cited by examiner

*Primary Examiner* — Joseph J Nguyen
(74) *Attorney, Agent, or Firm* — Harness, Dickey & Pierce, P.L.C.

(57) ABSTRACT

A video call method and system may use a two-way transmission of a visual effect or an auditory effect. A server may manage and store content that includes visual information or auditory information as an effect to apply to a video call in association with an effect identifier. A server may receive, during the video call, an effect identifier and may transmit the visual information or audio information associated with the effect identifier to a reception-side electronic device together with a data packet for the video call.

14 Claims, 12 Drawing Sheets

METHOD AND SYSTEM FOR VIDEO CALL USING TWO-WAY COMMUNICATION OF VISUAL OR AUDITORY EFFECT

CROSS-REFERENCE TO RELATED APPLICATION(S)

This application claims priority under 35 U.S.C. §119 to Korean Patent Application No. 10-2015-0179248 filed Dec. 15, 2015, in the Korean Intellectual Property Office (KIPO), the entire contents of which are incorporated herein by reference.

BACKGROUND

Field

One or more example embodiments relate to a video call method and system using two-way communication of a visual effect or an auditory effect.

Description of Related Art

A video call according to the related art is provided in a form in which a fixably preset encoded effect is synthesized with a video by filtering a video transmitted and received for the video call at an image filtering level. Thus, it is difficult to bi-directionally transfer a variety of effects in real time.

In the related art, an identifier for an effect desired at a transmission-side electronic device of a video call is transferred to a reception-side electronic device and the reception-side electronic device retrieves the effect corresponding to the received identifier and plays the retrieved effect. For example, Korean Patent Publication No. 10-2010-0050021 discloses technology for transmitting a code corresponding to an event to a portable terminal so that the portable terminal outputs an effect corresponding to the code. However, in the related art, if the effect corresponding to the received identifier is absent in the reception-side electronic device, the effect may not be applied to a video call in real time.

The related art may include, for example, PCT/KR/2014/010167, US20140019540A1, US20130332543A1, US20130260893, etc.

SUMMARY

One or more example embodiments show a server including a memory having computer readable instruction stored thereon and at least one processor configured to execute the computer-readable instructions. The computer readable instructions include instruction to store and manage contents each including visual information or auditory information in a database in association with an effect identifier, control the server to receive an effect identifier and a first data packet for a video call from a transmission-side electronic device among a plurality of electronic devices over a network, the first data packet including a video from the transmission-side electronic device, extract content from the stored contents, the extracted content corresponding to the received effect identifier from the database, and control the server to transmit the extracted content, and a second data packet to a reception-side electronic device. The reception side electronic device is among the plurality of electronic devices over the network in association with the received data packet. The second data packet includes the video from the transmission-side electronic device.

One or more example embodiments provide a video call method and system that may bi-directionally transmit and apply a variety of effects during a video call in such a manner that an identifier of a corresponding effect is transferred to a server in response to a user selection on one of the variety of effects presented at a transmission-side electronic device during the video call and the server transmits the effect corresponding to the identifier, for example, content for applying the effect, to the reception-side electronic device together with a data packet of the video call.

One or more example embodiments also provide a video call method and system that may minimize or reduce an influence of adding an effect against a video call by transmitting an effect optimized for a network situation by changing a parameter of an effect, for example, content, such as a transmission type, a screen resolution, a number of frames, a data transmission rate of voice, etc., based on network traffic, such as an amount of packets being transmitted and received.

One or more example embodiments show a video call method that includes storing and managing, at a server, contents each including visual information or auditory information in a database in association with an effect identifier, receiving, at the server, an effect identifier and a first data packet for a video call from a transmission-side electronic device among a plurality of electronic devices over a network, extracting content corresponding to the received effect identifier from the database, and transmitting the extracted content and a second data packet to a reception-side electronic device among the plurality of electronic devices over the network. The first data packet includes a video from the transmission-side electronic device. The second data packet includes the video from the transmission-side electronic device.

One or more example embodiments show a non-transitory computer-readable medium storing computer readable instructions which when executed by a processor in a server causes the server to store and manage contents each including visual information or auditory information associated with an effect identifier in a database, receive an effect identifier and a first data packet for a video call from a transmission-side electronic device, the first data packet including a video from the transmission-side electronic device, extract content corresponding to the effect identifier received from the transmission-side electronic device from the database, and transmit the extracted content and a second data packet to a reception-side electronic device, the second data packet including the video form the transmission-side electronic device.

According to some example embodiments, it is possible to bi-directionally transmit and apply a variety of effects during a video call in such a manner that an identifier of a corresponding effect is transferred to a server in response to a user selection on one of the variety of effects presented at a transmission-side electronic device during the video call and the server transmits the effect corresponding to the identifier, for example, content for applying the effect, to the reception-side electronic device together with a data packet of the video call.

Also, according to some example embodiments, it is possible to minimize or reduce an influence of adding an effect against a video call by transmitting an effect optimized for a network situation by changing a parameter of an effect, for example, content, such as a transmission type, a screen resolution, a number of frames, a data transmission rate of voice, etc., based on network traffic such as an amount of packets being transmitted and received.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
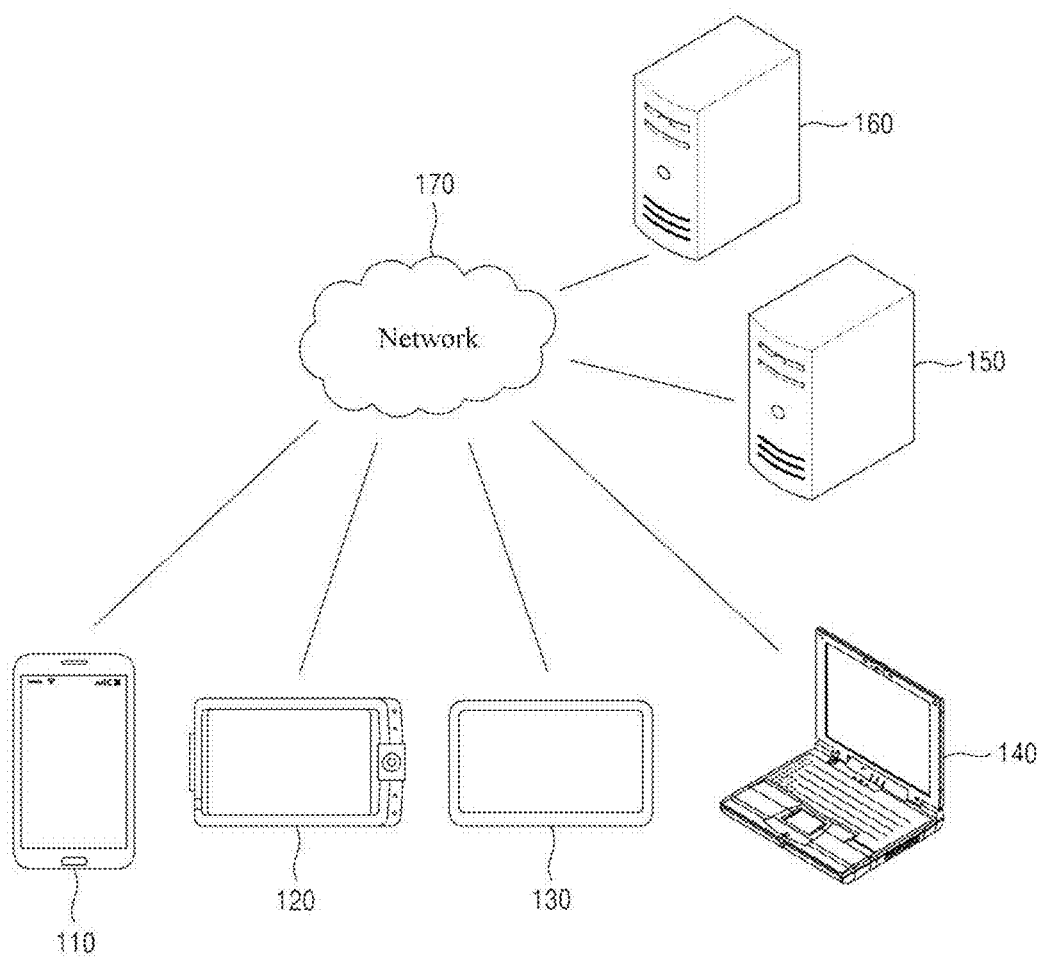
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relation to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there is no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, the number of electronic devices and/or the number of servers are not limited thereto.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, navigation, a computer, a laptop computer, a digital broadcasting terminal, a personal digital assistant (PDA), a portable multimedia player (PMP), a tablet PC, and the like. For example, the electronic device 110 may communicate with other electronic devices 120, 130, and 140, and/or the servers 150 and/or 160 over the network 170 in a wired communication manner or in a wireless communication manner.

The communication scheme is not particularly limited and may include a communication scheme that uses near field communication between devices as well as a communication method using a communication network, for example, a mobile communication network, the wired Internet, the wireless Internet, and a broadcasting network. For example, the network 170 may include at least one of a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, files, contents, services, and the like, through communication with the plurality of electronic devices 110, 120, 130, and/or 140 over the network 170.

For example, the server 160 may provide a file for installing an application to the electronic device 110 connected over the network 170. In this case, the electronic device 110 may install the application using the file provided from the server 160. The electronic device 110 may use a service and/or content provided from the server 150 by connecting to the server 150 under control of at least one program, for example, browser or the installed application, and an operating system (OS) included in the electronic device 110. For example, in response to a service request message transmitted from the electronic device 110 to the server 150 over the network 170 under control of the application, the server 150 may transmit a code corresponding to the service request message to the electronic device 110. The electronic device 110 may provide content to a user by displaying a code-based screen under control of the application. As another example, the server 150 may set a communication session for a messaging service and may route message transmission and reception between the plurality of electronic devices 110, 120, 130, and/or 140 through the set communication session. Also, the server 150 may relay a video call between the plurality of electronic devices 110, 120, 130, and/or 140. For example, during a process in which a video call between the electronic device 110 and the electronic device 120 is ongoing, the server 150 may receive a data packet for the video call transmitted from the electronic device 110 and may transfer the data packet to the electronic device 120.

Figure 2:
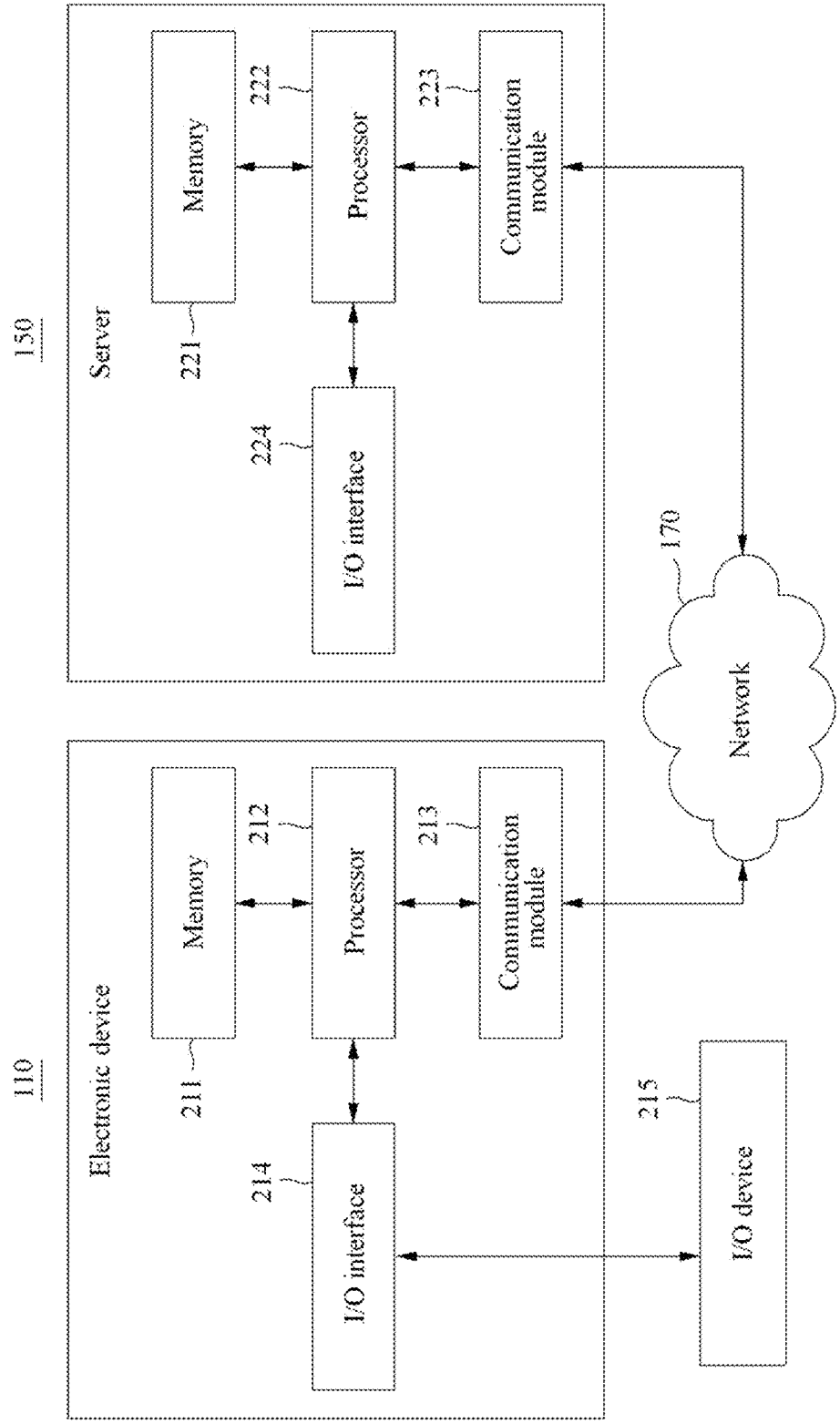
FIG. 2 is a block diagram illustrating a configuration of an electronic device and a server according to at least one example embodiment.

FIG. 2 is a block diagram illustrating a configuration of an electronic device and a server according to at least one example embodiment. Also, FIG. 2 illustrates a configuration of the electronic device 110 as an example for a single electronic device and illustrates a configuration of the server 150 as an example for a single server. The other electronic devices 120, 130, and 140, and/or the server 160 may have the same or similar configuration to the electronic device 110 and/or the server 150.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), read only memory (ROM), a disk drive, etc., as a computer-readable storage medium. Also, an OS and at least one program code, for example, computer-readable instructions for the browser or an application for a video call installed and executed on the electronic device 110, may be stored in the memory 211, 221. Such software constituent elements may be loaded from another computer-readable storage medium separate from the memory 211, 221 using a drive mechanism. The other computer-readable storage medium may include, for example, a floppy drive, a disk, a tape, a DVD/CD-ROM drive, a memory card, etc. According to other example embodiments, software constituent elements may be loaded to the memory 211, 221 through the communication module 213, 223, instead of, or in addition to, the computer-readable storage medium. For example, at least one program may be loaded to the memory 211, 221 based on a program, for example, the application, installed by files provided over the network 170 from developers or a file distribution system, for example, the server 150 of FIG. 1 that provides an installation file of the application.

The processor 212, 222 may be configured to process computer-readable instructions, for example, the aforementioned at least one program code, of a computer program by performing basic arithmetic operations, logic operations, and I/O operations. The computer-readable instructions may be provided from the memory 211, 221 and/or the communication module 213, 223 to the processor 212, 222. For example, the processor 212, 222 may be configured to execute received instructions in response to the program code stored in the storage device such as the memory 211, 222.

The communication module 213, 223 may provide a function for communication between the electronic device 110 and the server 150 over the network 170, and may provide a function for communication with another electronic device, for example, the electronic device 120 or another server, for example, the server 160. For example, the processor 212 of the electronic device 110 may transfer a request, for example, a request for a video call service, generated based on a program code stored in the storage device, such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, etc., may be stored in a storage medium further includable in the electronic device 110.

The I/O interface 214, 224 may be a device used for interface with an I/O device 215. For example, an input device may include a keyboard, a mouse, etc., and an output device may include a device, such as a display for displaying a communication session of an application. As another example, the I/O interface 214 may be a device for interface with an apparatus in which an input function and an output function are integrated into a single function, such as a touch screen. In detail, when processing instructions of the computer program loaded to the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include a greater or lesser number of constituent elements than the number of constituent elements shown in FIG. 2. However, there is no need to clearly illustrate many constituent elements according to the related art. For example, the electronic device 110 may include at least a portion of the I/O devices 215, or may further include other constituent elements, for example, a transceiver, a global positioning system (GPS) module, a camera, a variety of sensors, a database, and the like. In further detail, if the electronic device 110 is a smartphone, the electronic device 110 may be configured to further include a variety of constituent elements, for example, an acceleration sensor, a gyro sensor, a camera, various types of physical buttons or a button using a touch panel, an I/O port, etc, which are generally included in a smartphone.

Herein, the server 150 may be a system apparatus that provides a video call service to a communication terminal connected over the network 170. Here, the electronic device 110 and the electronic device 120 may be communication terminals that receive the video call service from the server 150 over the network 170. For example, the server 150 may set a communication session for the electronic devices 110 and 120. In this example, a video call between the electronic devices 110 and 120 may proceed by transmitting and receiving a data packet through the set communication session. In the video call, a transmission-side electronic device, for example, the electronic device 110, and a reception-side electronic device, for example, the electronic device 120, may be present from perspective view of a single piece of packet data. Here, a single electronic device may simultaneously function as a transmission side and a reception side. For example, the electronic device 110 may include all of constituent elements for the transmission side and constituent elements for the reception side.

Figure 3:
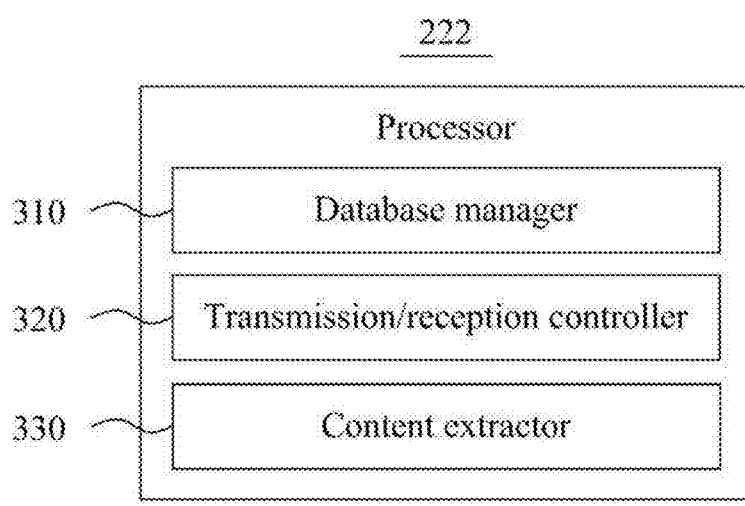
FIG. 3 is a block diagram illustrating an example of constituent elements includable in a processor of a server according to at least one example embodiment.
Figure 4:
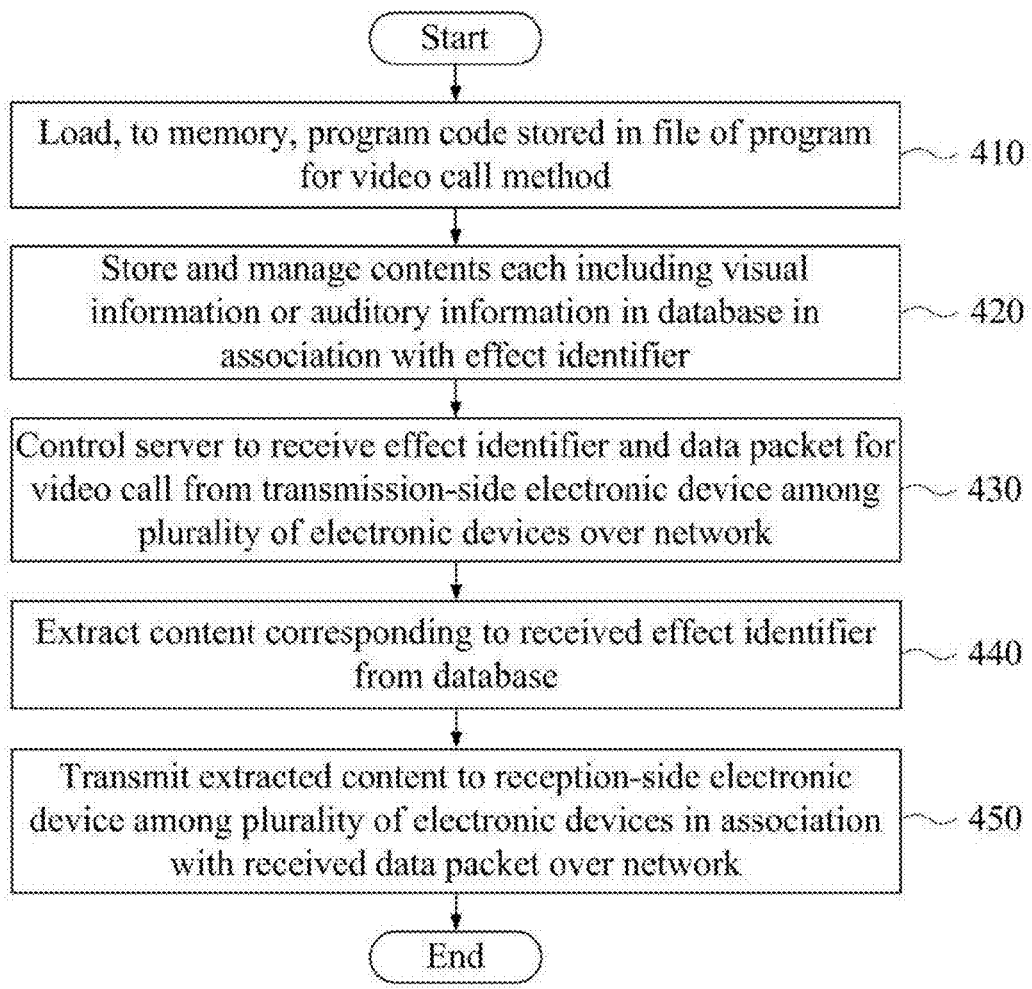
FIG. 4 is a flowchart illustrating an example of a video call method performed at a server according to at least one example embodiment.

FIG. 3 is a block diagram illustrating an example of constituent elements includable in a processor of a server according to at least one example embodiment, and FIG. 4 is a flowchart illustrating an example of a video call method performed at a server according to at least one example embodiment.

Referring to FIG. 3, the server 150 may correspond to a video call server or a video call system, and the processor 222 of the server 150 may include a database manager 310, a transmission/reception controller 320, and a content extractor 330 as constituent elements. The processor 222 and the constituent elements of the processor 222 may control the server 150 to perform operations 410 through 450 included in the video call method of FIG. 4. Here, the processor 222 and the constituent elements of the processor 222 may be configured to execute instructions according to a code of at least one program and a code of an OS included in the memory 221. Here, the constituent elements of the processor 222 may represent different functions performed at the processor 222. For example, the database manager 310 may be employed as a functional expression such that the processor 222 may operate to manage a database in response to the instructions.

In operation 410, the processor 222 may load, to the memory 221, a program code stored in a file of a program for the video call method. For example, the program may be a program installed on the server 150 to relay a data packet for a video call between electronic devices. In response to executing the program installed on the server 150, the processor 222 may load the program code from the file of the program to the memory 221.

Here, the processor 222 and the database manager 310, the transmission/reception controller 320, and the content extractor 330 included in the processor 222 may be different functional representations of the processor 222 to perform operations 420 through 450 by executing an instruction of a portion corresponding to the program code loaded to the memory 221. The processor 222 and the constituent elements of the processor 222 may control the server 150 to perform operations 420 through 450. For example, the processor 222 may control the communication module 223 included in the server 150 so that the server 150 may communicate with at least one of other electronic devices, for example, the electronic device 120. As another example, the processor 222 may control the server 150 to retrieve a file of the stored program and to store a program code in the memory 222 when loading the program to the memory 221.

In operation 420, the database manager 310 may store and manage contents each including visual information or auditory information in a database in association with an effect identifier. For example, the visual information may include information such as an image, an animation, or a moving picture applied to a video of the video call, information used to modulate the video of the video call, and the like. For example, the auditory information may include a sound effect inserted into the video call, information used to modulate a voice signal of the video call, and the like. Such visual information or auditory information, or audiovisual information may be stored as each single piece of content, and each piece of content may be identified based on a corresponding effect identifier. That is, contents according to a variety of effects may be stored and maintained in the database in order to provide a service, for example, inserting the variety of effects, such as an image, an animation, a moving picture, a sound effect, etc., into a video call, as well as modulating the video of the video call through image filtering or modulating voice of the video call.

In operation 430, the transmission/reception controller 320 may control the server 150 to receive an effect identifier and a data packet for the video call from a transmission-side electronic device among a plurality of electronic devices over the network. The transmission-side electronic device may correspond to the aforementioned electronic device 110. Here, the effect identifier received from the transmission-side electronic device may include an identifier of an effect selected through a selection interface that is displayed on a screen of the transmission-side electronic device together with a video for the video call. For example, the transmission-side electronic device may display an interface for selecting a single effect from among the variety of effects during the video call on the screen. Here, in response to a user of the transmission-side electronic device selecting at least one effect, an effect identifier of the selected effect may be transmitted to the server 150 together with the data packet to be currently transmitted.

In operation 440, the content extractor 330 may extract content corresponding to the received effect identifier from the database. As described above, a variety of contents may be identified based on an effect identifier. The content extractor 330 may search for and extract the received effect identifier from the database.

In operation 450, the transmission/reception controller 320 may transmit the extracted content to a reception-side electronic device among the plurality of electronic devices over the network in association with the received data packet. The reception-side electronic device may correspond to the aforementioned electronic device 120. Here, the content may be played in association with displaying, at the reception-side electronic device, the video included in the data packet transmitted from the server on a screen of the reception-side electronic device. Visual information or auditory information included in the content may be output from the reception-side electronic device in response to playing of the content. For example, a visual image included in the content may be displayed to be overlapped on the video for the video call on the screen of the reception-side electronic device, or an auditory image included in the content may be output through a loudspeaker of the reception-side electronic device.

According to the example embodiment, in response to a user selecting a single effect from among a variety of effects provided from the transmission-side electronic device during a video call beyond a simple image filtering level of modulating a video, an identifier of the selected effect may be transferred to a server and the server may transmit an effect, for example, content, corresponding to the corresponding effect identifier to a reception-side electronic device together with a data packet of the video call. In this manner, a variety of effects may be transmitted and applied using two-way communication during the video call.

Figure 5:
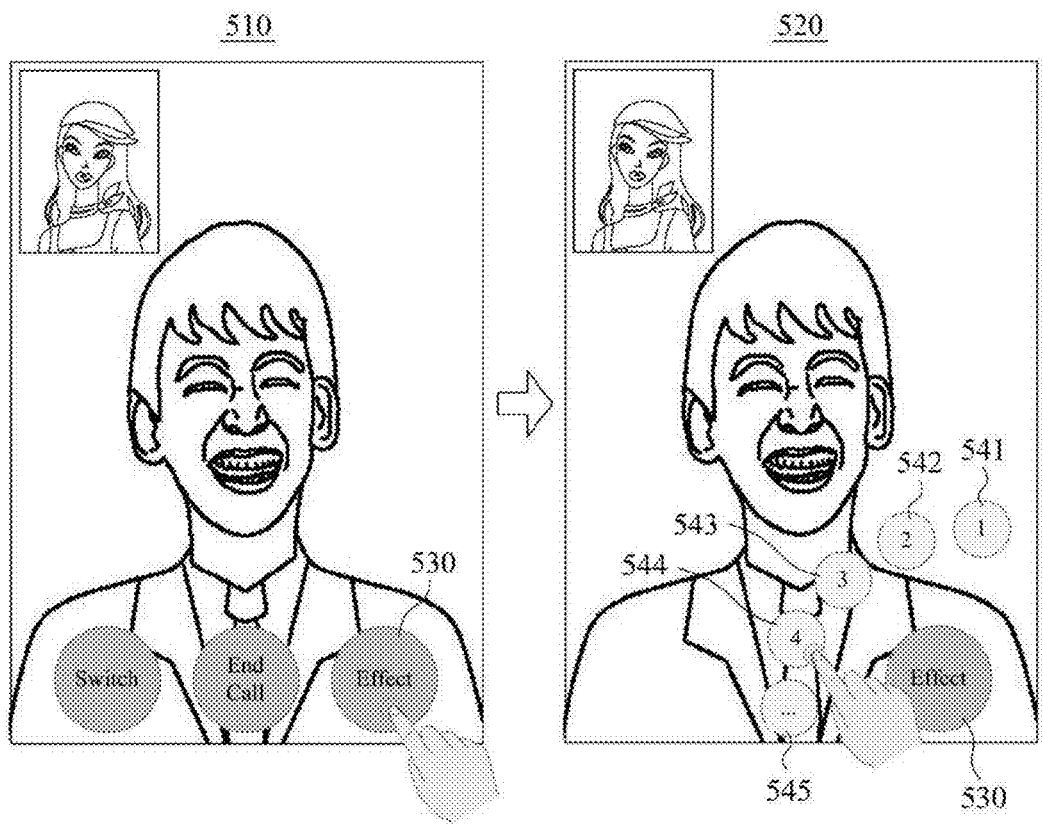
FIG. 5 illustrates an example of a screen for selecting an effect at a transmission-side electronic device according to at least one example embodiment.

FIG. 5 illustrates an example of a screen for selecting an effect at a transmission-side electronic device according to at least one example embodiment. A first screen 510 shows an example of a screen of the transmission-side electronic device on which a video of a video call is displayed. Here, the first screen 510 shows an example of displaying interface "Effect" 530 for selecting an effect together with a video. If a user selects the interface "Effect" 530, for example, touches on an area on which the interface "Effect" 530 is displayed on a smartphone including a touch screen, interfaces 541, 542, 543, and 544 for selecting a single effect from among a plurality of effects may be displayed on a screen, for example, a second screen 520. If the user selects the interface '4' 544, the transmission-side electronic device may transmit an effect identifier of an effect corresponding to the selected interface '4' 544 to the server 150 over the network. For example, the transmission-side electronic device may transmit the effect identifier and a data packet for the video call to the server 150.

The server 150 may search a database using the effect identifier, and may transmit content found and extracted from the database to a reception-side electronic device in association with the data packet.

On the second screen 520, an interface ' . . . ' 545 may be an interface for referring to other additional effects. If the user selects the interface ' . . . ' 545, an additional user interface for selecting other additional effects in addition to effects corresponding to the interfaces 541 through 544 may be provided to the user.

Figure 6:
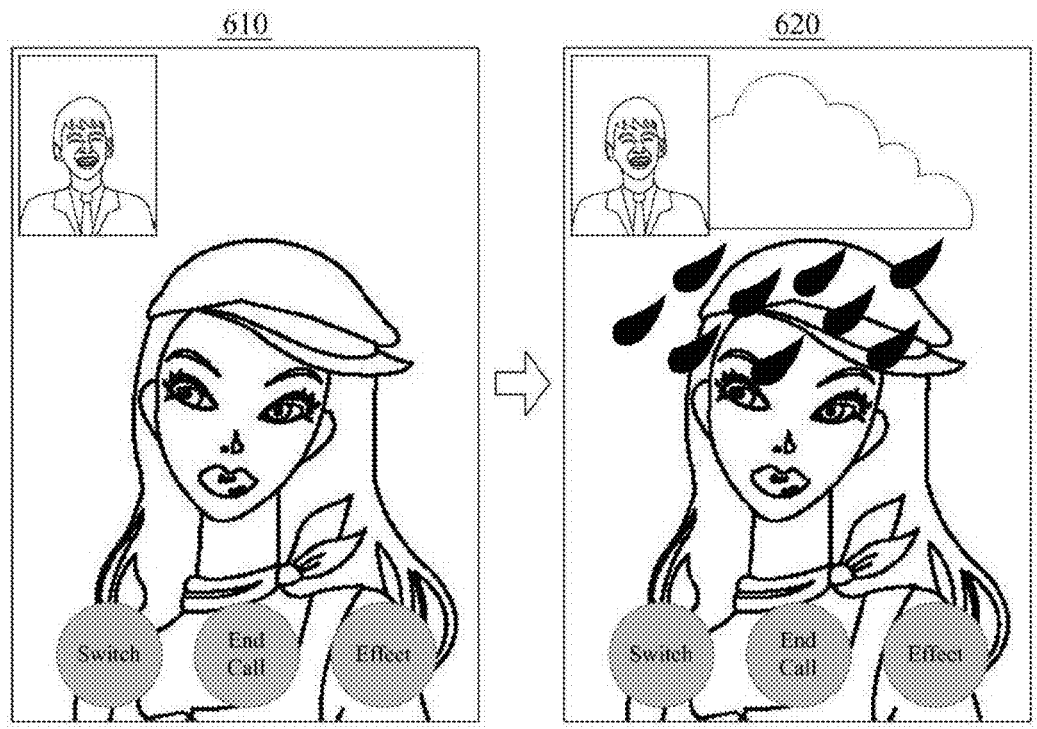
FIG. 6 illustrates an example of a screen for outputting an effect at a reception-side electronic device according to at least one example embodiment.

FIG. 6 illustrates an example of a screen for outputting an effect at a reception-side electronic device according to at least one example embodiment. A third screen 610 shows an example of a screen of the reception-side electronic device on which a video of a video call is displayed. Here, a fourth screen 620 shows an example in which content transmitted from the server 150 in association with a data packet for a video call is displayed to be overlaid on a video for the video call.

According to some example embodiments, an effect can be provided as new content together with a video beyond an existing image filtering level of filtering a video for the video call. The effect may also include an auditory effect in addition to a visual effect.

Meanwhile, if further providing additional content accompanies an increase in a data amount, a data transmission time may be additionally used. According to some example embodiments, it is possible to minimize or reduce an influence of adding an effect addition against a video call by transmitting an effect optimized for a network situation by changing a parameter of an effect, for example, content, such as a transmission type, a screen resolution, a number of frames, a data transmission rate of voice, etc., based on network traffic such as an amount of packets being transmitted and received.

Figure 7:
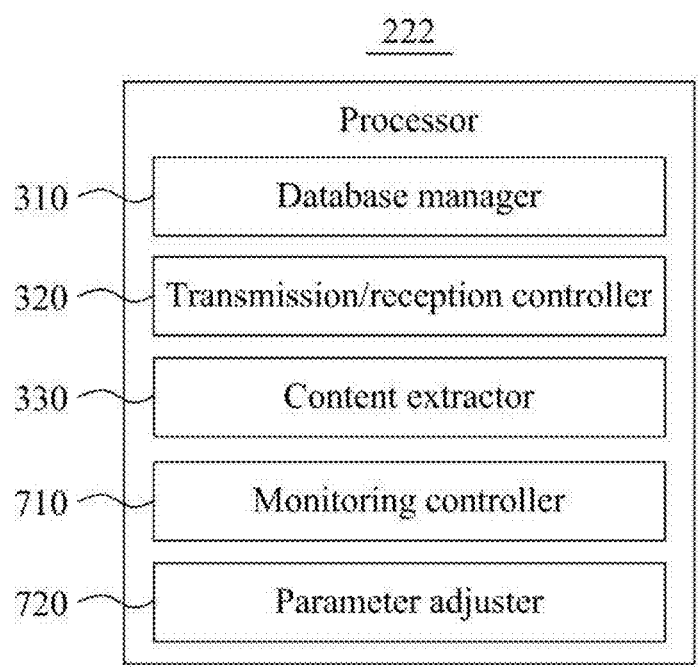
FIG. 7 is a block diagram illustrating an example of constituent elements further includable in a process or of a server according to at least one example embodiment.
Figure 8:
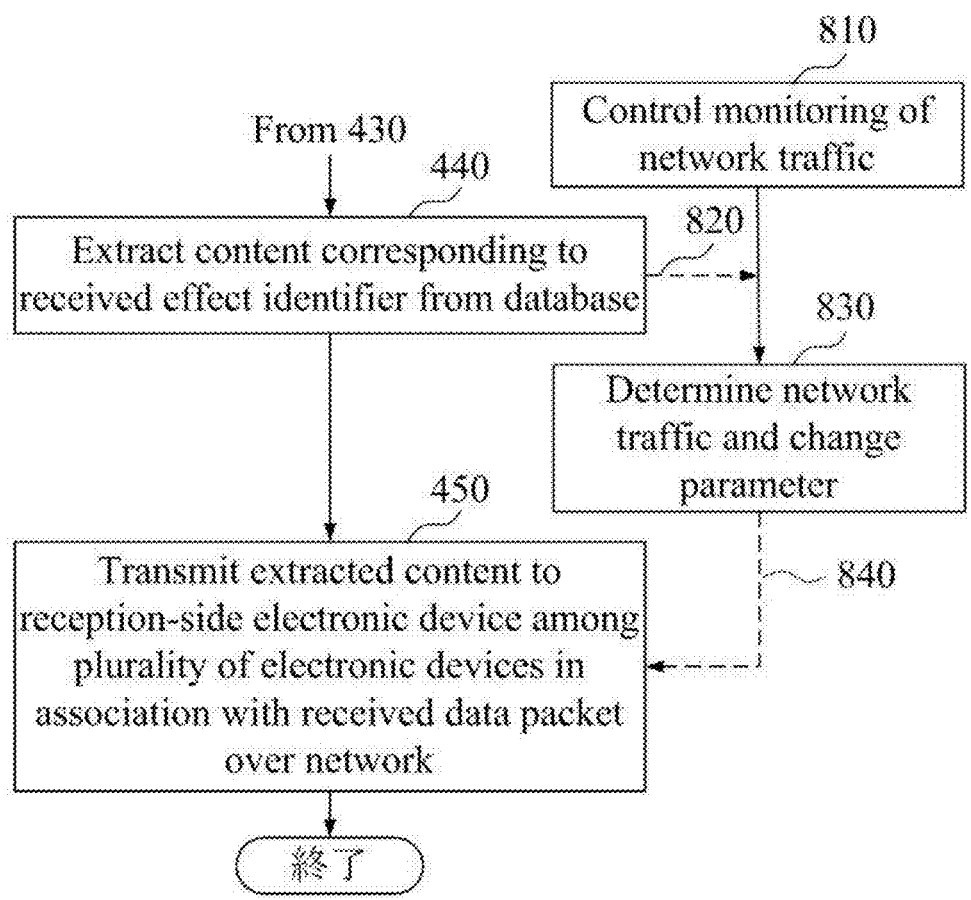
FIG. 8 is a flowchart illustrating an example of an operation of changing a parameter of content according to at least one example embodiment.

FIG. 7 is a block diagram illustrating an example of constituent elements further includable in a processor of a server according to at least one example embodiment, and FIG. 8 is a flowchart illustrating an example of an operation of changing a parameter of content according to at least one example embodiment. Referring to FIG. 7, the processor 222 further includes a monitoring controller 710 and a parameter adjuster 720. The monitoring controller 710 and the parameter adjuster 720 may be functional representations of the processor 222 to perform operations 810 and 830 of FIG. 8, respectively.

In operation 810, the monitoring controller 710 may control monitoring of network traffic. For example, the monitoring controller 710 may control the server 150 to monitor network traffic according to relaying a data packet between a plurality of electronic devices. Operation 810 may be performed after operation 410 of FIG. 3 and may be continuously and periodically performed. As another example, operation 810 may be performed after 430 of FIG. 3 and may be performed to verify current network traffic in response to receiving the data packet and the effect identifier.

A first dotted arrow 820 indicates a process in which the content extractor 330 that performs operation 440 notifies the parameter adjuster 720 that the content is extracted from the database through operation 440 of FIG. 3.

In operation 830, the parameter adjuster 720 may determine the network traffic and may change a parameter. For example, the parameter adjuster 720 may perform operation 830 in response to the notification from the content extractor 330 that the content is extracted. Here, the parameter adjuster 720 may determine current network traffic for the extracted content based on the network traffic monitored at the monitoring controller 710. Also, the parameter adjuster 720 may change a parameter of the extracted content based on the determined network traffic.

A second dotted arrow 840 indicates a process of transferring the changed parameter to the transmission/reception controller 330 that performs operation 450. In operation 450, the transmission/reception controller 330 may transmit the extracted content to the reception-side electronic device based on the extracted content.

In detail, in operation 830, the parameter adjuster 720 may select a single transmission type between a first transmission type and a second transmission type as a parameter based on the network traffic.

Here, the first transmission type may be a transmission type for synthesizing visual information included in the extracted content with a video included in the data packet and transmitting the synthesized information. For example, a transmission type in which an effect corresponding to content is transferred from the server 150 to the reception-side electronic device in a state synthesized with the video of the data packet may be the first transmission type. The second transmission type may be a transmission type for transmitting visual information separate from the video included in the data packet to be overlaid on the video included in the data packet. For example, in the second transmission type, the server 150 may transmit each of the video and the content to the reception-side electronic device. In this case, the reception-side electronic device may display the video and may display the content on the displayed video using an overlay scheme.

For example, if the determined network traffic is less than or equal to a predetermined threshold, the server 150 may transmit the data packet and the content in the first transmission type. Conversely, if the determined network traffic exceeds the threshold, the server 150 may transmit the data packet and the content in the second transmission type. That is, if the network traffic is relatively low, a calculation time used for effect synthesis may have no great influence on a real-time property of the video call although the server 150 directly synthesizes visual information of the content with the video included in the data packet and transmits the synthesized information. Thus, it is possible to enhance the synchronization between the video and the effect by transmitting the data packet and the content in the first transmission type. Also, if the network traffic is relatively high, the server 150 may transmit the data packet and the content to the reception-side electronic device and the reception-side electronic device may overlapping output the video of the data packet and visual information of the content using an overlay scheme instead of synthesizing. In this manner, it is possible to reduce the influence against the real-time property of the video call.

As another example, in operation 830, the parameter adjuster 720 may determine the network traffic based on a number of frames or a screen resolution of visual information included in the content as a parameter for the content.

For example, the server 150 may reduce an influence of an effect to be applied to a video against network traffic by relatively reducing a number of frames and a screen resolution of visual information included in content according to an increase in the determined network traffic. Conversely, the server 150 may relatively increase at least one of the number of frames and the screen resolution of visual information included in the content according to a decrease in the determined network traffic. The screen resolution and the number of frames may be automatically adjusted based on the determined network traffic by presetting the number of frames and the screen resolution of visual information based on the network traffic.

As another example, in operation 830, the parameter adjuster 720 may determine a data transmission rate of auditory information included in the content as a parameter of the content based on the network traffic. For example, the auditory information may include a sound effect or a voice modulation signal about a voice signal of the video call. Here, the parameter adjuster 720 may adjust a kilobit per second (kbps) for synchronizing an application point in time of the voice modulation signal or the sound effect to the voice signal based on the determined network traffic.

The example embodiments may be combined with each other. For example, the parameter adjuster 720 may minimize or reduce the influence of applying the effect influence against the real-time property of the video call by determining a transmission scheme as a second transmission scheme according to an increase in the network traffic and by simultaneously reducing the number of frames and the screen resolution of visual information and also lowering a data transmission rate of auditory information. Inversely, the parameter adjuster 720 may provide a further high quality effect by determining a transmission scheme as a first transmission scheme and by simultaneously increasing the number of frames and the screen resolution of visual information and also increasing the data transmission rate of auditory information.

Referring again to FIG. 5, the second screen 520 shows an example of a screen on which a portion, for example, interfaces 541, 542, 543, and 544, of various effects are preferentially displayed. As described, some effects among the entire effects may be recommended to the user. Hereinafter, a method of recommending an effect suitable for the user is described.

Figure 9:
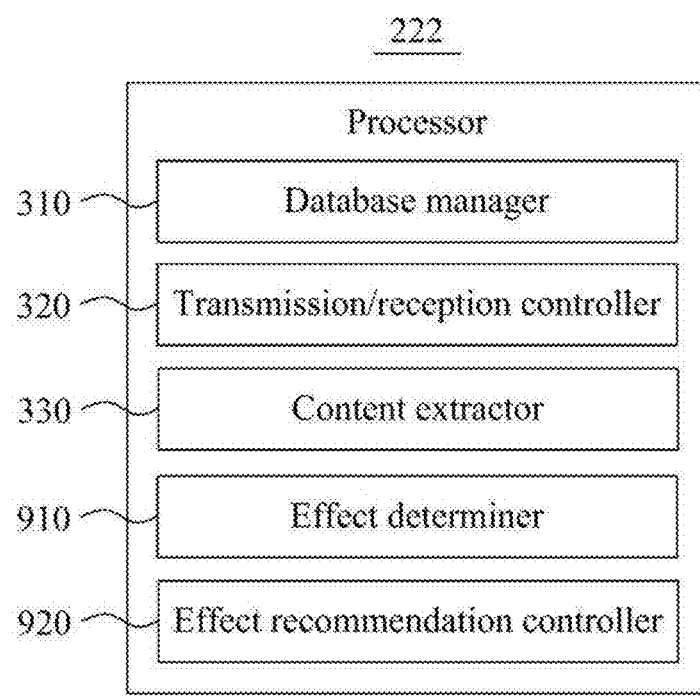
FIG. 9 is a block diagram illustrating another example of constituent elements further includable in a process or of a server according to at least one example embodiment.
Figure 10:
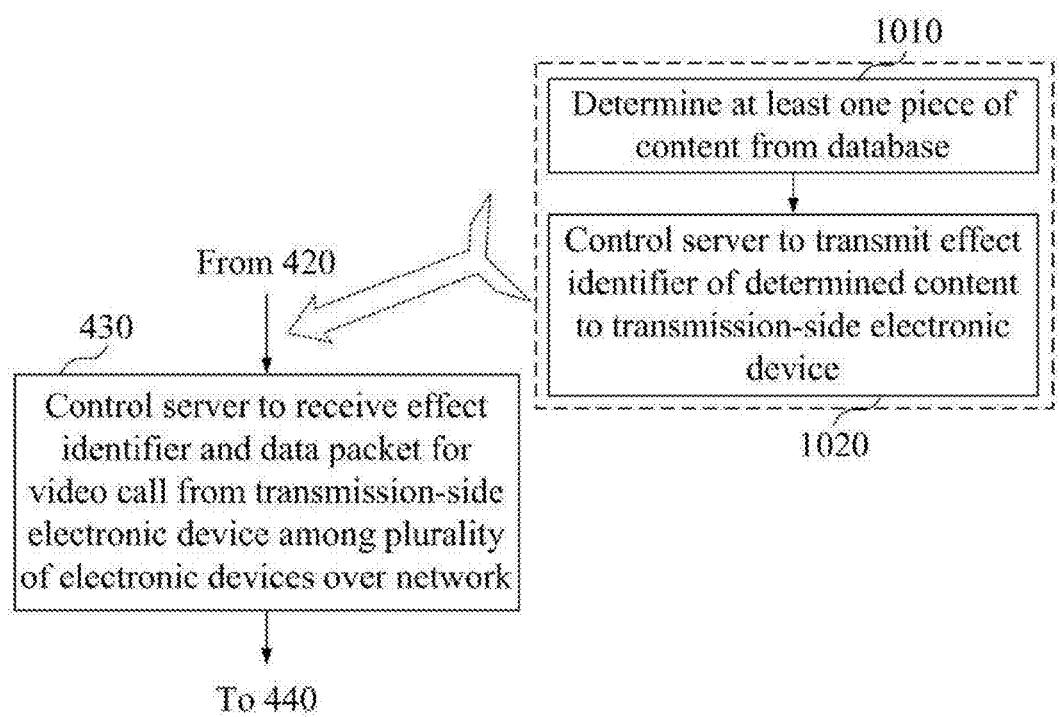
FIG. 10 is a flowchart illustrating an example of an operation of recommending an effect according to at least one example embodiment.

FIG. 9 is a block diagram illustrating another example of constituent elements further includable in a process or of a server according to at least one example embodiment, and FIG. 10 is a flowchart illustrating an example of an operation of recommending an effect according to at least one example embodiment. Referring to FIG. 9, the processor 222 further includes an effect determiner 910 and an effect recommendation controller 920. The effect determiner 910 and the effect recommendation controller 920 may be functional representations of the processor 222 to perform operations 1010 and 1020 of FIG. 10, respectively. Referring to FIG. 10, operations 1010 and 1020 may be performed between operations 420 and 430.

In operation 1010, the effect determiner 910 may determine at least one piece of content from a database. Here, a method of determining content to recommend as an effect will be further described.

In operation 1020, the effect recommendation controller 920 may control the server 150 to transmit an effect identifier of the determined content to the transmission-side electronic device. In this case, the transmission-side electronic device may recommend the user for the content, for example, the effect, corresponding to the effect identifier received from the server 150. For example, as shown in FIG. 5, an effect or a set of effects corresponding to an effect identifier received from the server 150 among the variety of effects may be preferentially displayed for the user.

An effect to recommend to the user may be determined using a variety of schemes.

For example, in operation 1010, the effect determiner 910 may determine information about at least one of a gender and an emotional state by analyzing at least one of a voice formant, a voice pitch, and a voice intensity included in the data packet. For example, a frequency distribution of voice of a human being may vary based on various characteristics, such as a gender, a vocal length, an anatomic structure of vocal, and the like. For example, the male voice spectrum is analyzed to be distributed in a low band, for example, 4 kHz or less and the female voice spectrum is analyzed to be distributed in a high band as well as the low band. Also, the spectrum is distributed to be different based on a vocalization characteristic of language. The effect determiner 910 may analyze and determine a gender or an emotional state of the user by analyzing the voice. Here, the effect determiner 910 may determine content suitable for the gender or the emotional state of the user from the database, based on the determined information.

As another example, in operation 420, the database manager 310 may accumulate, in the database, information about a location and a time zone in which contents managed in the database are selected by users of the voice call. Here, in operation 1010, the effect determiner 910 may determine at least one piece of content from the database based on at least one of a time zone of the video call and a location of the transmission-side electronic device. Here, the location of the transmission-side electronic device may include a current location of the transmission-side electronic device measured using a GPS module, etc., included in the transmission-side electronic device, and the time zone of the video call may include information about a time in which the video call is currently ongoing.

According to other example embodiments, a further variety of information may be used to recommend an effect. For example, prior to operation 1010, the transmission/reception controller 320 may receive, from the transmission-side electronic device, user body information, for example, a heartbeat, measured at a sensor included in the transmission-side electronic device, state information set to a conversation application installed on the transmission-side electronic device, or a conversation log stored in the conversation application. Here, in operation 1010, the effect determiner 910 may determine at least one piece of content from the database based on the received information. The conversation application may be the same application as the application installed on the transmission-side electronic device, or may be a separate different application. State information of the conversation application may be information that is set to the conversation application by the user in association with a state of the user. Also, the conversation log stored in the conversation application may be a record of conversations of chats performed between the user and other users through the conversation application. The heartbeat, state information, the conversation log, and the like may be used to determine the emotional state of the user, and the content may be determined based on the determined emotional state.

Also, facial feature information of the user may be used to determine the content. The effect determiner 910 may analyze a facial expression of the user and the like from previous videos of the video call, may determine the emotional state of the user based on an analysis result, and may determine the content based on the determined emotional state.

As described above, the server 150 may recommend the effect suitable for the user by additionally using a variety of information.

Figure 11:
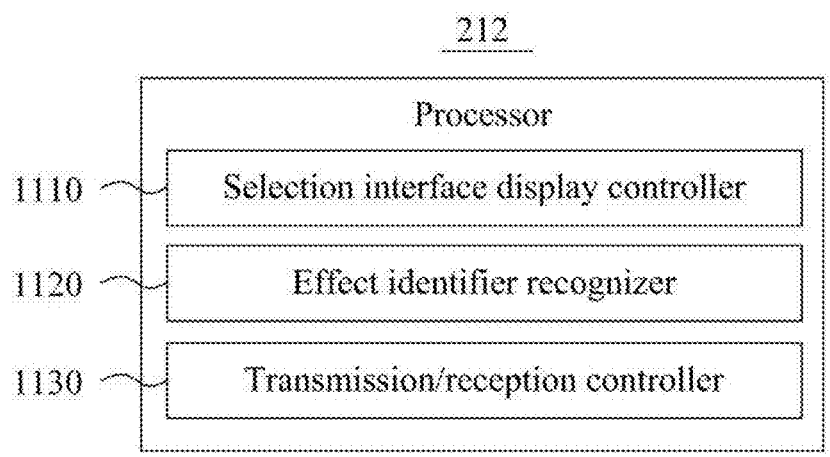
FIG. 11 is a block diagram illustrating an example of constituent elements includable in a processor of an electronic device according to at least one example embodiment.
Figure 12:
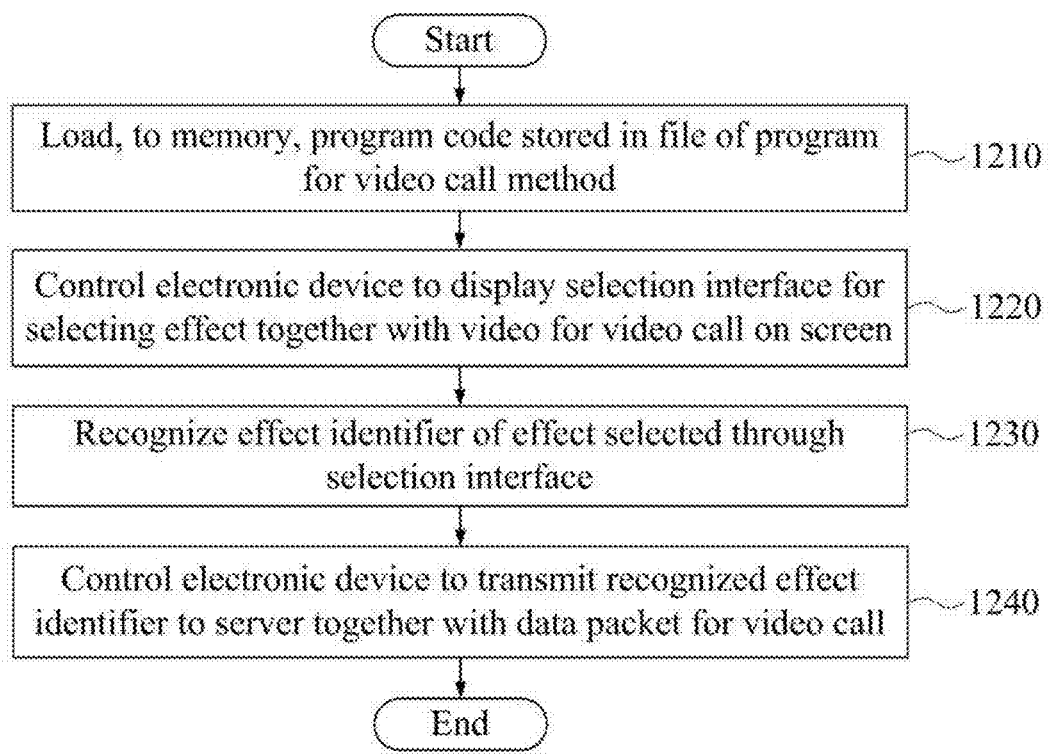
FIG. 12 is a flowchart illustrating an example of a video call method performed at an electronic device according to at least one example embodiment.

FIG. 11 is a block diagram illustrating an example of constituent elements includable in a processor of an electronic device according to at least one example embodiment, and FIG. 12 is a flowchart illustrating an example of a video call method performed at an electronic device according to at least one example embodiment.

Referring to FIG. 11, the electronic device 110 may correspond to the aforementioned transmission-side electronic device. The processor 212 of the electronic device 110 may include a selection interface display controller 1110, an effect identifier recognizer 1120, and a transmission/reception controller 1130 as constituent elements. The processor 212 and the constituent elements of the processor 212 may control the electronic device 110 to perform operations 1210 through 1240 included in the video call method of FIG. 12. Here, the processor 212 and the constituent elements of the processor 212 may be configured to execute instructions corresponding to a code of at least one program and a code of an OS included in the memory 211. Here, the constituent elements of the processor 212 may be representations of different functions performed at the processor 212. For example, the selection interface display controller 1110 may be employed as a functional representation such that the processor 212 may operate to display a selection interface on a screen in response to the instructions.

In operation 1210, the processor 212 may load, to the memory 211, a program code stored in a file of an application for the video call method. For example, the application may be a program installed on the electronic device 110 to utilize a video call service. In response to executing the application installed on the electronic device 110, the processor 212 may load, to the memory 211, the program code from the file of the application.

Here, the processor 212 and the selection interface display controller 1110, the effect identifier recognizer 1120, and the transmission/reception controller 1130 may be different functional representations of the processor 212 to perform operations 1220 through 1240 by executing an instruction of a portion corresponding to the program loaded to the memory 211, respectively. The processor 212 and the constituent elements of the processor 212 may control the electronic device 110 to perform operations 1220 through 1240. For example, the processor 212 may control the communication module 213 included in the electronic device 110 so that the electronic device 110 may communicate with the server 150 or at least one of other electronic devices, for example, the electronic device 120. As another example, the processor 212 may control the electronic device 110 to retrieve a stored file of the application and to store the program code in the memory 211.

In operation 1220, the selection interface display controller 1110 may control the electronic device 110 to display a selection interface for selecting an effect together with a video for a video call on a screen. The selection interface may be an interface of displaying information about a variety of effects on a screen and receiving a selection of an effect. FIG. 5 illustrates an example of displaying each of various effects in an icon form. As described above with FIG. 5, effects preferentially displayed on the screen through the selection interface among the various effects may be effects selected and recommended using a variety of schemes.

In operation 1230, the effect identifier recognizer 1120 may recognize an effect identifier of an effect selected through the selection interface. In FIG. 5, the user may select an effect by touching an area on which one of the interfaces 541, 542, 543, and 544 is displayed. Each effect may be matched to an effect identifier. The effect identifier recognizer 1120 may recognize an effect identifier corresponding to the effect selected in response to an input of the user.

In operation 1240, the transmission/reception controller 1130 may control the electronic device 110 to transmit the recognized effect identifier to the server 150 together with a data packet for the video call. The data packet for the video call may be continuously transmitted to the server 150. Here, once the effect is selected in response to the input of the user, the transmission/reception controller 1130 may transmit the effect identifier corresponding to the selected effect to the server 150 together with the data packet that includes a video associated with the input of the user.

According to some example embodiments, it is possible to bi-directionally transmit and apply a variety of effects during a video call in such a manner that an identifier of a corresponding effect is transferred to a server in response to a user selection on one of the variety of effects presented at a transmission-side electronic device during the video call and the server transmits the effect corresponding to the identifier, for example, content for applying the effect, to the reception-side electronic device together with a data packet of the video call. Also, it is possible to minimize or reduce an influence of adding an effect against the video call by transmitting an effect optimized for a network situation by changing a parameter of an effect, for example, content, such as a transmission type, a screen resolution, a number of frames, a data transmission rate of voice, etc., based on network traffic such as an amount of packets being transmitted and received.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A server comprising:
a memory having computer-readable instructions stored thereon; and
at least one processor configured to execute the computer-readable instructions to
store and manage contents each including visual information or auditory information in a database in association with an associated effect identifier,
control the server to receive an effect identifier and a first data packet for a video call from a transmission-side electronic device among a plurality of electronic devices over a network, the first data packet including a video from the transmission-side electronic device,
extract content from the stored contents, the extracted content corresponding to the received effect identifier from the database,
select a single transmission type between a first transmission type for synthesizing visual information included in the extracted content with the video included in a second data packet and transmitting the synthesized visual information and a second transmission type for transmitting the visual information separate from the video included in the second data packet to be overlaid on the video included in the second data packet, based on network traffic, and
control the server to transmit the extracted content and the second data packet to a reception-side electronic device among the plurality of electronic devices over the network in association with the first data packet, the second data packet including the video from the transmission-side electronic device, the at least one processor configured to execute the computer-readable instructions to control the server to transmit the extracted content and the second data packet by,
controlling the server to synthesize the visual information with the video included in the second data packet and transmit the synthesized information to the reception-side electronic device in response to a selection of the first transmission type, or controlling the server to transmit the second data packet and the visual information to the reception-side electronic device in response to a selection of the second transmission type.

2. The server of claim 1, wherein the at least one processor is further configured to execute the computer readable instructions to, control the server to monitor the network traffic according to relaying transmission of the second data packet between the plurality of electronic devices; and change a parameter about the extracted content based on the network traffic, the changing the parameter including the selecting a single transmission type.

3. The server of claim 2, wherein the at least one processor is configured to execute the computer readable instructions to, determine a number of frames or a screen resolution of visual information included in the extracted content based on the network traffic control the server to modify the extracted content based on the determined screen resolution or number of frames and to transmit the modified extracted content to the reception-side electronic device.

4. The server of claim 2, wherein the at least one processor is configured to execute the computer readable instructions to, determine a data transmission rate of auditory information included in the extracted content based on the network traffic, and control the server to transmit the extracted content to the reception-side electronic device at the determined data transmission rate in order to synchronize an application time of the auditory information with respect to a voice signal included in the second data packet.

5. The server of claim 1, wherein the at least one processor is further configured to execute the computer readable instructions to, determine information about at least one of a gender and an emotional state by analyzing at least one of a voice formant, a voice pitch, and a voice intensity included in the data packet, determine to recommend at least one piece of the stored contents from the database based on the determined information; and control the server to transmit an effect identifier of the at least one piece of the stored contents in order to recommend an effect for the video call.

6. The server of claim 1, wherein the at least one processor is configured to execute the computer readable instructions to, accumulate, in the database, information about a location and a time zone in which the stored contents managed in the database are selected by users of a voice call, determine to recommend at least one piece of the stored contents from the database based on at least one of a time zone of the video call and a location of the transmission-side electronic device, and control the server to transmit an effect identifier of the at least one piece of the stored contents to the transmission-side electronic device in order to recommend an effect for the video call.

7. The server of claim 1, wherein the at least one processor is further configured to execute the computer readable instructions to, determine at least one piece of content from the database based on at least one of user body information measured at and transmitted from a sensor included in the transmission-side electronic device, state information set to a conversation application installed on the transmission-side electronic device, a conversation log stored in the conversation application, and user facial feature information acquired by analyzing a video included in the first data packet, and control the server to transmit an effect identifier of the determined at least one piece of content to the transmission-side electronic device in order to recommend an effect for the video call.

8. A video call method comprising:

storing and managing, at a server, contents each including visual information or auditory information in a database in association with an associated effect identifier;

receiving, at the server, an effect identifier and a first data packet for a video call from a transmission-side electronic device among a plurality of electronic devices over a network, the first data packet including a video from the transmission-side electronic device;

extracting, at the server, content corresponding to the received effect identifier from the database;

changing a parameter about the extracted content based on network traffic; and transmitting, at the server, the extracted content and a second data packet to a reception-side electronic device among the plurality of electronic devices over the network, the second data packet including the video from the transmission-side electronic device, wherein the changing the parameter includes selecting a single transmission type between a first transmission type for synthesizing visual information included in the extracted content with the video included in the second data packet and transmitting the synthesized information and a second transmission type for transmitting the visual information separate from the video included in the second data packet to be overlaid on the video included in the second data packet, based on the network traffic, and the transmitting including, synthesizing the visual information with the video included in the second data packet and transmitting the synthesized information to the reception-side electronic device in response to a selection of the first transmission type, or transmitting the second data packet and content that includes the visual information to the reception-side electronic device in response to a selection of the second transmission type.

9. The video call method of claim 8, further comprising:

monitoring network traffic according to relaying transmission of the second data packet between the plurality of electronic devices.

10. The video call method of claim 9, wherein the changing the parameter comprises determining a number of frames or a screen resolution of visual information included in the extracted content based on the network traffic, and the transmitting comprises modifying the extracted content based on the determined screen resolution or the determined number of frames and transmitting the content to the reception-side electronic device.

11. The video call method of claim 9, wherein
the changing the parameter comprises determining a data transmission rate of auditory information included in the extracted content based on the network traffic, and
the transmitting comprises transmitting the extracted content to the reception-side electronic device at the determined data transmission rate in order to synchronize an application time of the auditory information with respect to a voice signal included in the second data packet.

12. A non-transitory computer-readable medium storing computer readable instructions which when executed by a processor in a server causes the server to
store and manage contents each including visual information or auditory information associated with an associated effect identifier in a database,
receive an effect identifier and a first data packet for a video call from a transmission-side electronic device, the first data packet including a video from the transmission-side electronic device,
extract content corresponding to the effect identifier received from the transmission-side electronic device from the database,
change a parameter about the extracted content based on network traffic by selecting a single transmission type between a first transmission type for synthesizing visual information included in the extracted content with the video included in the second data packet and transmitting the synthesized information and a second transmission type for transmitting the visual information separate from the video included in the second data packet to be overlaid on the video included in the second data packet, based on network traffic,
transmit the extracted content and a second data packet to a reception-side electronic device, the second data packet including the video from the transmission-side electronic device, by
synthesizing the visual information with the video included in the second data packet and transmitting the synthesized information to the reception-side electronic device in response to a selection of the first transmission type, or
transmitting the second data packet and content that includes the visual information to the reception-side electronic device in response to a selection of the second transmission type.

13. The non-transitory computer-readable medium of claim 12 storing computer readable instruction which when executed by the processor further cause the processor to
monitor the network traffic according to relaying transmission of the second data packet between a plurality of electronic devices.

14. The non-transitory computer-readable medium of claim 12, storing computer readable instruction which when executed by the processor further cause the processor to
select an effect identifier of at least one piece of content from the database by analyzing at least one of a voice or a video included in the first data packet transmitted from the reception-side electronic device, location information of the reception-side electronic device, a time zone in which the video call proceeds, user body information measured at a sensor included in the transmission-side electronic device and received, state information set in association with a conversation application installed on the transmission-side electronic device, and a conversation log stored in association with the conversation application.

* * * * *